(12) United States Patent
Davi' et al.

(10) Patent No.: US 7,240,465 B2
(45) Date of Patent: Jul. 10, 2007

(54) TRANSFER SYSTEM OF FOOD PRODUCTS BY MEANS OF PICKERS

(75) Inventors: Daniele Davi', Ferrara (IT); Daniele Mezzaro, Ferrara (IT); David Rosignoli, Pontegradella (IT)

(73) Assignee: C.T. Pack S.r.l., Fossalta di Copparo, Ferrara (IT)

( * ) Notice: Subject to any disclaimer, the term of this patent is extended or adjusted under 35 U.S.C. 154(b) by 107 days.

(21) Appl. No.: 11/111,561

(22) Filed: Apr. 20, 2005

(65) Prior Publication Data

US 2005/0241494 A1  Nov. 3, 2005

(30) Foreign Application Priority Data

Apr. 22, 2004  (IT) .................... MI2004A0787

(51) Int. Cl.
- *B65B 57/00* (2006.01)
- *B65B 35/38* (2006.01)
- *B65B 5/08* (2006.01)
- *B65B 5/10* (2006.01)

(52) U.S. Cl. .................. 53/58; 53/55; 53/498; 53/240; 53/244; 198/437; 700/213

(58) Field of Classification Search .................... 53/55, 53/58, 498, 500, 502, 284.5, 136.1, 53, 240, 53/244, 246; 198/437; 700/213, 259
See application file for complete search history.

(56) References Cited

U.S. PATENT DOCUMENTS 5,040,056 A * 8/1991 Sager et al. .................. 348/88

| | | | | |
|---|---|---|---|---|
| 6,002,125 A * | 12/1999 | Schubert | .................. | 250/223 R |
| 6,122,895 A * | 9/2000 | Schubert | .................. | 53/55 |
| 6,360,142 B1 * | 3/2002 | Miura et al. | ................. | 700/245 |
| 6,671,578 B1 * | 12/2003 | D'Amelio et al. | .......... | 700/225 |
| 2003/0037515 A1 * | 2/2003 | Herzog | ......................... | 53/473 |

FOREIGN PATENT DOCUMENTS

CH  693710 A5 * 12/2003
JP  07237622 A * 9/1995

* cited by examiner

*Primary Examiner*—Stephen F. Gerrity
(74) *Attorney, Agent, or Firm*—Hedman & Costigan; James V. Costigan

(57) ABSTRACT

A transfer system for food products (P) having a product conveyor (11); a first support conveyor (13) suitable for moving supports (12) in equicurrent with the food products (P); a plurality of pickers (R1, R2, R3) situated in series along the run of the products (P) and supports (12) for individually collecting the products (P) from the product conveyor (11) to arrange them on the supports (12) translated from the first support conveyor (13); presence and position surveying devices (C1, C2) of which at least one is situated upstream with respect to the food products (P), of a first picker (R1) of the plurality of pickers (R1, R2, R3) suitable for detecting the presence, number, position and orientation of each product (P); an electronic image with a presence and position surveying device (C3), also connected to an electronic image identification and data processing system (34), wherein the pickers (R1–R4) are equipped with handlers (22) with an individual grip of the sucker type, with an anti-crash system and a suction circuit.

18 Claims, 5 Drawing Sheets

TRANSFER SYSTEM OF FOOD PRODUCTS BY MEANS OF PICKERS

BACKGROUND OF THE INVENTION

The present invention relates to a food product transfer system by means of pickers.

More specifically, the invention relates to a transfer system of food products using pickers which collect the products moving along a line to transfer them to supports also running on transport lines.

Product handling systems and equipment of this type are known in the technique of canning plants, as they allow the automation of canning operations.

A plant of the above-mentioned type is the object of European patent 0 856 465 in the name of Gerhard Schubert GmbH.

The equipment object of European patent 0 856 465 belongs to the area of product handling systems by means of pickers for transferring the same from a feeding line to a support system.

Object of the invention, according to the Schubert patent, is to provide a process and related equipment for reducing the time lost for handling supports to be filled, without jeopardizing the plant efficiency.

This object is achieved, according to the patent disclosure, thanks to the fact that
   supports and products move in counter-current; and
   the support velocity is adjusted according to the products in movement.

The above-mentioned Schubert European patent asserts the impossibility of transferring the disclosure of technological control measures for equicurrent transport systems to counter-current systems: as the diminishing of products on the conveyor belt, on one side, and the filling level of supports on the conveyor belt, on the other side, develop in a reciprocally inverse way.

Even if the equipment according to the Schubert patent provides a rational solution to the problem of product transfer, it has various drawbacks.

First of all, the handling of the transfer in counter-current, from the point of view of the concomitant optimisation of high productivity and minimum waste, both in terms of partially filled supports and non-collected products, appears rather problematical in the regulation, and cannot be used in the case of different products.

Another drawback of a logistic type is linked to the arrangement of the equipment and machinery which, in the case of the counter-current system, can create ties which may not fit in with the planimetry of the facility housing the plant.

A general objective of the present invention is, therefore, to provide a system for the transfer of food products by means of pickers, running in equicurrent, suitable for operating at high speeds, with minimum or null waste products.

Another objective of the present invention is to allow a simple control and management of the system.

Also within the objectives of the present invention, is the provision of a packaging plant which makes use of the transfer system of food products by means of pickers.

SUMMARY OF THE INVENTION

The present invention provides a transfer system of food products (P) including a product conveyor (11); a first support conveyor (13) suitable for moving supports (12) in eguicurrent with the food products (P); a plurality of pickers (R1, R2, R3) situated in series along the run of said products (P) and supports (12) and suitable for individually collecting said products (P) from the product conveyor (11) to arrange them on the supports (12) translated from the first support conveyor (13); presence and position surveying means (C1, C2) of which at least one is situated upstream with respect to the food products (P), of a first picker (R1) of said plurality of pickers (R1, R2, R3) suitable for detecting the presence, number, position and orientation of each product (P); an electronic image identification and data processing system (34), in addition to calculation of potentiality, flow rate and distribution of the charge between the pickers (R1, R2, R3), as well as the control of the speed of the conveyor belts, to transfer data and instructions to the pickers, characterized in that said transfer system also comprises a second parallel support conveyor (14), transferring the supports (12) in equicurrent with respect to the food products (P), assisted by a specific finishing picker (R4), situated downstream of said plurality of pickers (R1, R2, R3), in turn are equipped with presence and position surveying means (C3), also connected to said electronic image identification and data processing system (34) wherein said pickers (R1–R4) are equipped with handlers (22), with an individual grip of the sucker type, with a rotatable anti-crash system and a suction circuit, comprising a suction group for each handler (22).

Further characteristics of the invention are described in the appended specification.

The system for the conveying of food products according to the invention includes:
   a product conveyor;
   a first support conveyor suitable for moving supports in equicurrent with the product flow;
   a plurality of pickers placed in series along the run of said products and supports, suitable for collecting said products from the product conveyor in order to position them on supports moved by the first support conveyor;
   presence and position surveying means situated up-stream with respect to the product flow, at least of the first picker, suitable for detecting the presence, position and orientation of each product;
   an electronic image identification and data processing system, for transferring data and instructions to the pickers;
   the system also includes a second parallel support conveyor, transferring the supports in equicurrent with respect to the product flow, assisted by a specific finishing picker, situated downstream of said pickers, in turn equipped with surveying means.

BRIEF DESCRIPTION OF THE SEVERAL VIEWS OF THE DRAWINGS

The characteristics and advantages of a transfer system according to the present invention will appear more evident from the following illustrative and non-limiting drawings.

DETAILED DESCRIPTION OF THE INVENTION

Figure 1:
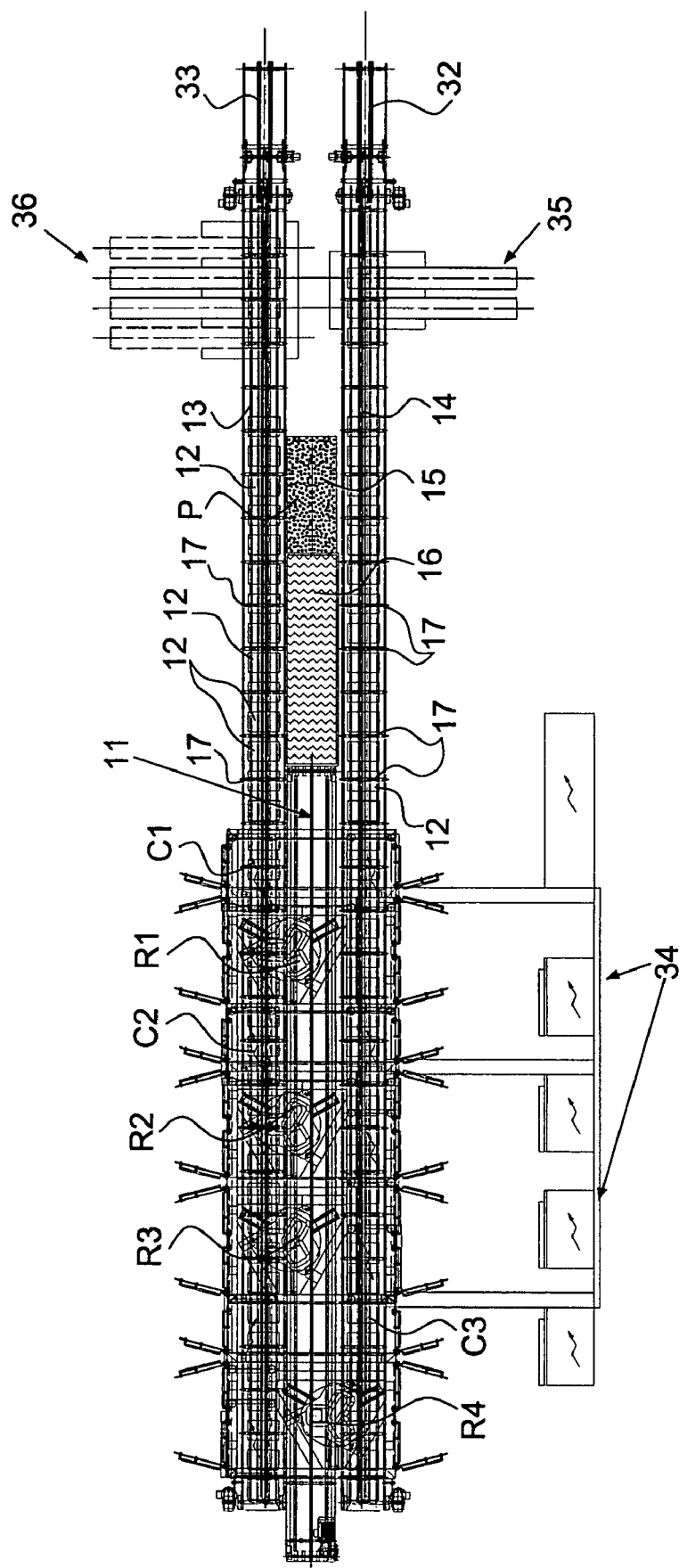
FIG. 1 is a schematic plan view of the transfer system according to the invention.

With reference to FIGS. 1 to 4, these illustrate a transfer system 10 of products P, preferably but not exclusively food products, by means of a series of pickers R1, R2, R3 which collect the products P from a product conveyer 11, to arrange them on supports 12, transported in equicurrent with respect to the product flow P, on a support conveyor 13.

The system therefore comprises the product conveyor 11; the first support conveyor 13, suitable for translating the supports 12 in equicurrent with the flow of products P; a number of pickers R1, R2 and R3 situated in series along the run of said products P and of the supports 12, suitable for individually collecting said products P from the product conveyor 11 to arrange them on supports 12 moved by the first support conveyor 13; presence and position surveying means C1, C2 of which at least one is situated up-stream of the first picker R1, with respect to the product flow P, suitable for detecting the presence, number, position and orientation of each product P, as well as (through processing this information), calculation of the potentiality, flow rate, charge distribution between the pickers R1, R2, R3 and conveyor rate.

In order to guarantee the concomitant optimisation of a high productivity and minimum waste, both in terms of partially filled supports and in terms of non-collected products, the transfer system 10 is equipped with a second support conveyor 14 parallel to the other two conveyors and moving the supports 12 in equicurrent with respect to the flow of products P.

This second support conveyor 14 is assisted by a specific finishing picker R4 which is situated downstream of said pickers R1, R2, R3 and is in turn equipped with presence and position surveying means C3 dedicated thereto and suitable for detecting the products P still present on the product conveyor 11.

The first support conveyor 13 does not release the last support 12 (in the advance direction of the products/supports), before being first completely filled with products P.

The subsequent product leaving the operating area of the three pickers R1, R2, R3, is handled by the picker R4, so that there is no loss of products downstream the product conveyor 11.

In short, the first three pickers R1, R2, R3 fill the supports in the presence of an excess of products P on the belt 11, whereas the fourth picker R4, fills the supports 12 moved by the second support conveyor 14, when few products P remain on the product conveyor 11.

On the basis of the position and orientation information sent by the presence and position surveying means C3, the finishing picker R4 identifies and collects the remaining products P, placing them on the supports 12 moved by the second support conveyor 14, so that, once the operative area of this last finishing picker R4 has been surpassed, there are no more products on the product conveyor 11, and the supports leaving the two support conveyors 13 and 14, are completely and neatly filled.

The most rational configuration selected for the system envisages the products conveyor 11 situated between the two support conveyors 13 and 14.

The supports 12 can have several shapes, according to manufacturing requirements, they can, for example, have the form of trays, or completely closable cases/boxes, just to mention two extreme configurations, or combination of the two.

In the present transfer system, different elements can therefore be used, which are suitable for holding products P and/or containing them, and said supports are selected according to the type and shape of the product P.

The pickers R1–R4, preferably of the 4-axis type, are equipped with handlers 22, with an individual grip of the sucker type, with an anti-crash system and the possibility of rotating, with a suction circuit possibly supported by a supplementary sleeve filter for air purification, to separate the dust coming from the handled product (for example, bread, flour, powders in general, etc . . . ) which could obstruct the main sucking filter, comprising a suction group for each handler 22, equipped with a pump, inversion valves, for example of the special Vortex type, and washing tubes of the sucker (with water) in counter-current with respect to the suction direction, and accessories (not shown, as already known).

Pickers and presence and position surveying means are assembled on supporting structures 19 equipped for line connections and with protection doors with sensors.

In the preferred embodiment, the first presence and position surveying means C1 are positioned before the first picker R1, including a first television monochromatic camera 20' for acquiring the image of the products P on the conveyor 11 and one or more high frequency light sources 21, preferably of the neon type, to light up the area, without flickering.

The presence and position surveying means C1–C3 refer to an image recognition and information processing electronic system for transferring data and instructions to the pickers.

An electronic board containing all the power and control equipment, and the above-mentioned processor or PC for the plant management, are identified with reference number 34.

The products are placed at random on a feeding belt 15, to be discharged onto a vibrating belt 16 to separate products possibly joined together.

The products are transferred from the vibrating belt 16 to the product conveyor 11 which is produced in the form of belt of a suitable material for allowing the best possible "vision" on the part of the television-cameras.

Figure 2:
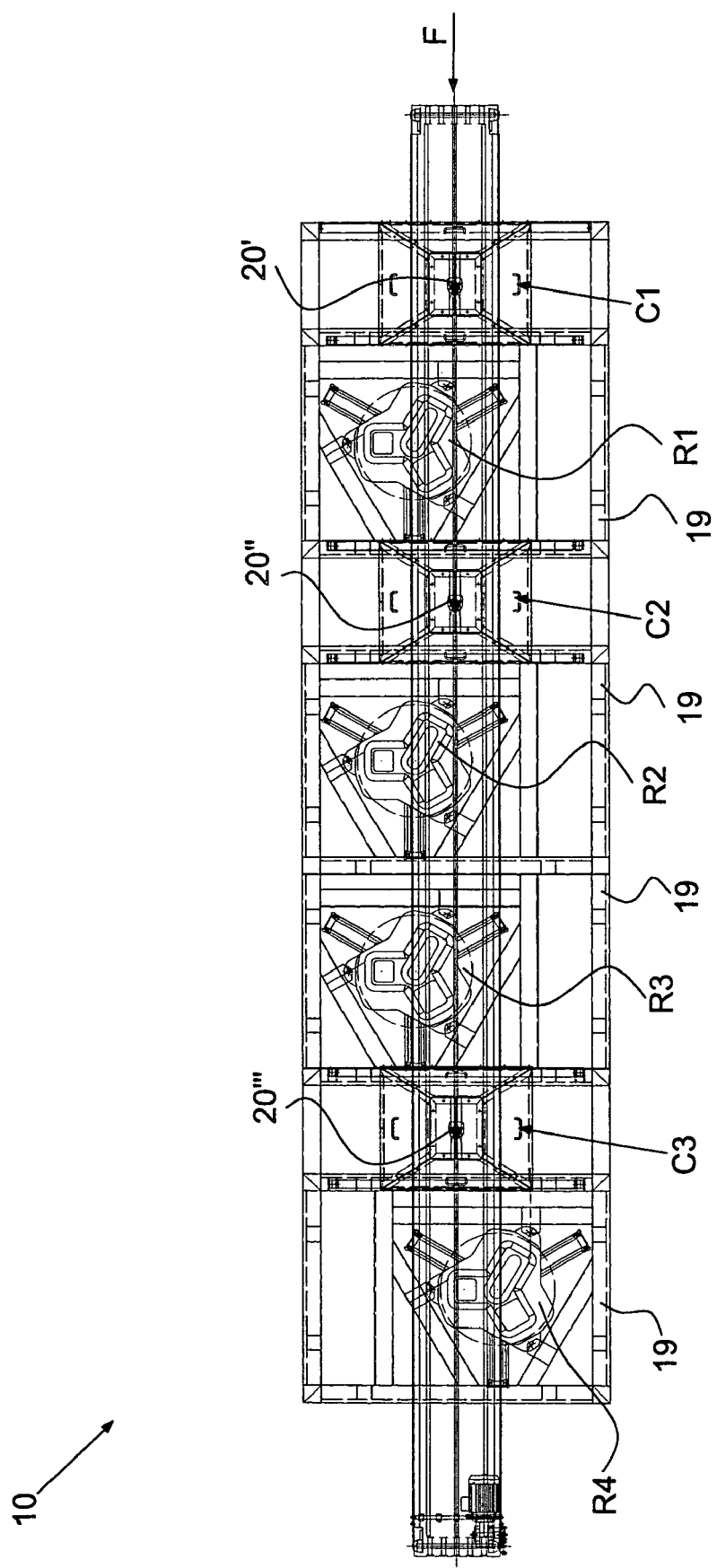
FIG. 2 is a schematic plan view of a detail of the transfer system of FIG. 1.
Figure 3:
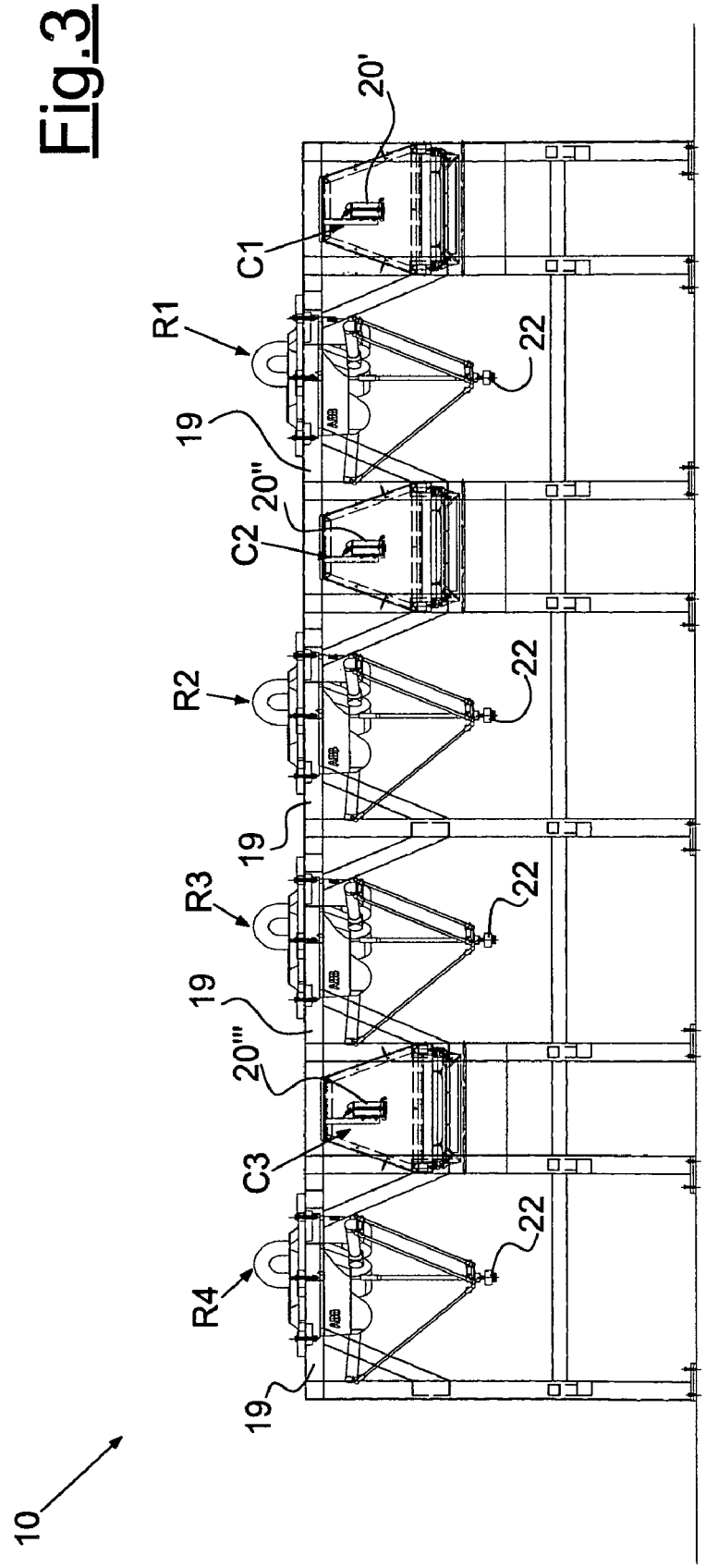
FIG. 3 is a raised side view of the detail of FIG. 2.
Figure 4:
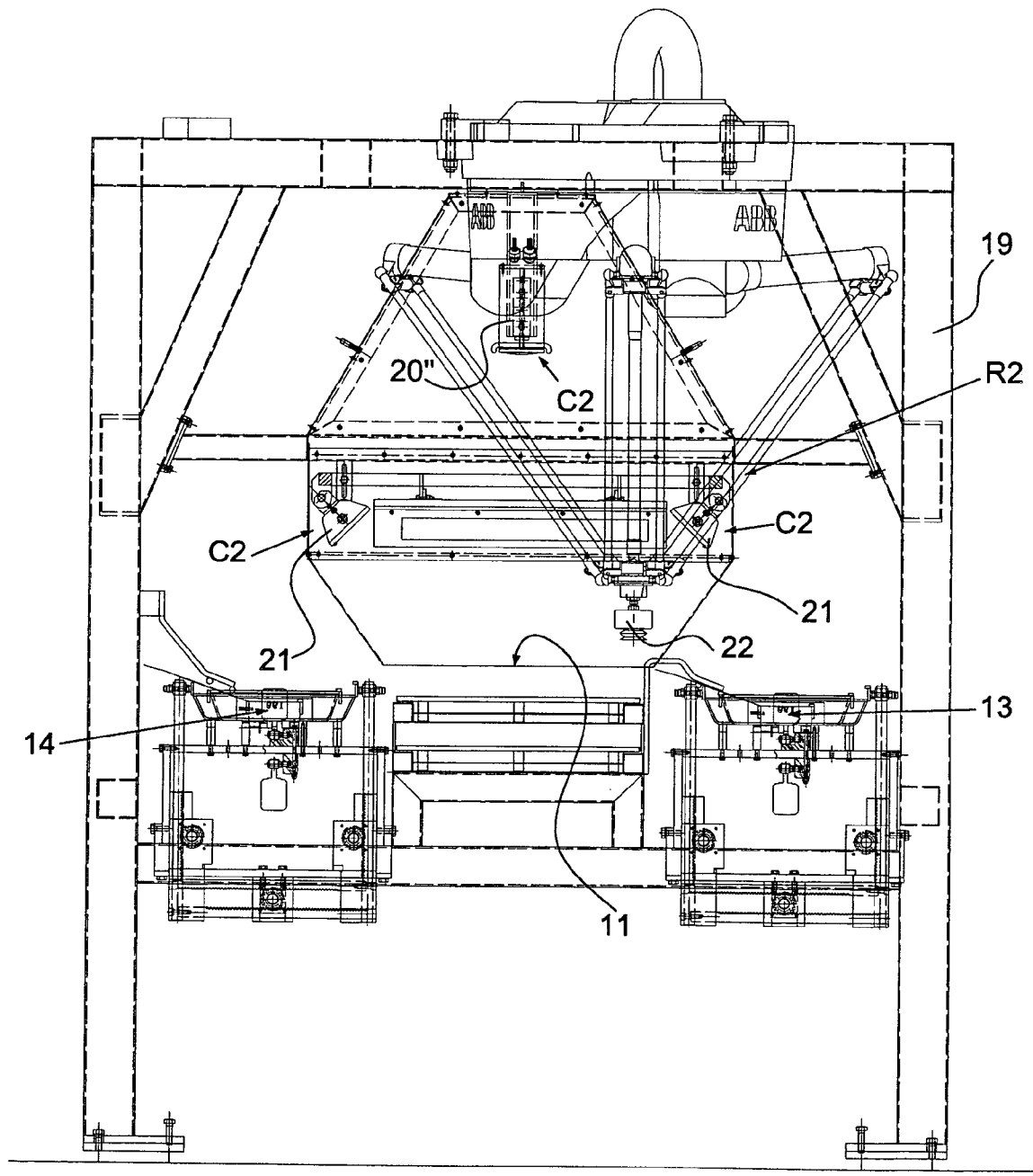
FIG. 4 is a front raised view of the detail of FIG. 2.

The products carried by the belt according to the direction of the arrow F of FIG. 2, are visualized by the first presence and position surveying means C1 and, in particular, by the first television camera 20', which identifies (through specific software) the number, position (plan coordinates), orientation, for the charge distribution between the three pickers R1, R2, R3, and controls the speed of the conveyor belts. This first information is used for subdividing the relevant products between the pickers R1, R2, R3. The second presence and position surveying means C2, and in particular a second television camera 20", is necessary for reassigning the position and number of products which have not been handled by the first picker R1.

The third presence and position surveying means C3 with the third television camera 20''', are solely and exclusively used for collecting the data useful for the handling of the products P on the part of the fourth finishing picker R4.

The three pickers R1, R2, R3 deposit the products oh the supports of the first support conveyor 13, whereas the finishing picker R4 deposits the products solely and exclusively on the supports of the second support conveyor 14.

The number of pickers described and illustrated, dedicated to the first conveyor and to the second support conveyor should be considered as being purely indicative as it could be increased for higher productivity requirements.

The relative speed of the two support conveyors is fixed in relation to the ratio between the number of pickers dedicated to the first and second support conveyor, within a certain regulation margin.

In the case of the example, the ratio varies from 1:2 to 1:5 and preferably within the ratio 1:3 with the first conveyor 13 which translates more rapidly.

The support conveyors 13 and 14 can be in the form of belts with a hop-chain 17 or porter-chain as normally called, in order to maintain and translate the supports according to a determined movement law, avoiding skidding.

As an alternative, the support conveyors (13, 14) can be of the belt type, envisaged for being run by further surveying means dedicated thereto, analogously to the surveying means used for the product conveyor 11.

These conveyors, moreover, are contemplated as being equipped with a support phaser at the inlet.

Encoders are situated on the product conveyor and on the two support conveyors, in order to detect the relative speed.

The objectives of optimising the productivity by reducing to the minimum, during the transient start-up and shut-down phase, or annulling, the waste, under steady conditions, are achieved thanks to the presence of the second conveyor 14 of the picker R4 and of the position surveying means C3 dedicated thereto.

Figure 5:
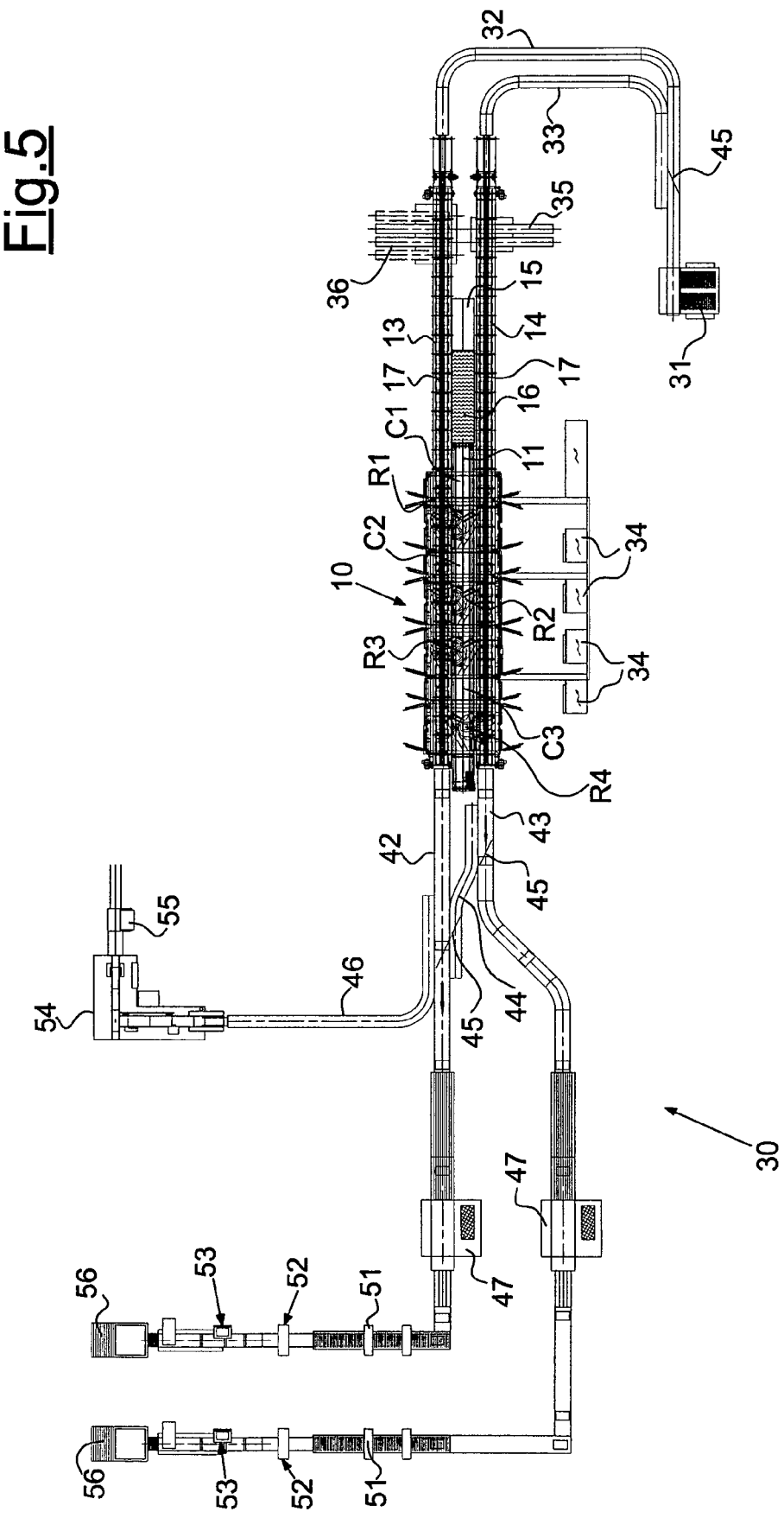
FIG. 5 is a schematic plan view of a packaging plant including the transfer system according to the invention.

A canning and packaging plant of products p comprises the transfer system according to the present invention and described hereunder, making reference to FIG. 5.

It is understood that this example of a plant is in no way binding, as the transfer system according to the invention can relate to any canning plant, with or without the packaging of products.

The illustrative plant is of the type called flow-pack, which indicates a type of packaging of the product by means of a closure at the ends and along a longitudinal direction of a film which surrounds the support carrying the product and is then stuck or thermo-welded and cut so as to seal support and product inside.

One or more packaging units (flow-packaging units) of the above type are present, for this purpose, along the plant line.

The canning and packaging plant for P products, preferably of the food type, is envisaged comprising both trays and case/boxes on which the products are arranged.

The plant 30 therefore comprises a case 31 (or box) former, from which a first case conveyor line 32 starts, alongside a second case conveyor line 33.

A diverter 45 is present on the first line, to divert the cases to the second line.

Along the run of the two case-carrying lines 32 and 33, removable strippers 35 and 36 are present for separating the stacked trays.

Said strippers can be removed when the products are to be placed directly in the cases.

After these strippers, the plant comprises the transfer system 10 described above, at the exit of the plant a line 42 is present as a continuation of the first support conveyor 13 and a line 43 which continues the second support conveyor 14.

These lines carry the fully loaded supports towards the final treatment.

With the use of a diverting belt 44 and two deviators 45, the cases/boxes are conveyed to the belt 46 and subsequently directed towards a closing device 54 and finally weighed on a scale 55. If the deviators 45 and the belt 44 are not used, the trays (if these supports are used) are sent to the two flow-packaging machines 47 and subsequently to the labelling machines 51, a metal detector 52, a weigh-price-marker 53 and finally to a stacking or storage station 56.

The plant described above for purely illustrative purposes, can naturally be in a simpler or more complex form according to the manufacturing demands and/or the materials and products to be handled.

The invention claimed is:

1. A transfer system for food products (P) comprising:
   a product conveyor (11);
   a first support conveyor (13) suitable for moving supports (12) in equicurrent with the food products (P);
   a plurality of pickers (R1, R2, R3) situated in series along the run of said products (P) and supports (12) and suitable for individually collecting said products (P) from the product conveyor (11) to arrange them on the supports (12) translated from the first support conveyor (13);
   presence and position surveying means (C1, C2) of which at least one is situated upstream with respect to the food products (P), of a first picker (R1) of said plurality of pickers (R1, R2, R3) suitable for detecting the presence, number, position and orientation of each product (P);
   an electronic image identification and data processing system (34), in addition to calculation of potentiality, flow rate and distribution of the charge between the pickers (R1, R2, R3), as well as the control of the speed of the conveyors, to transfer data and instructions to the pickers, characterized in that said transfer system also comprises a second parallel support conveyor (14), transferring the supports (12) in equicurrent with respect to the food products (P), assisted by a specific finishing picker (R4), situated downstream of said plurality of pickers (R1, R2, R3), in turn equipped with presence and position surveying means (C3), also connected to said electronic image identification and data processing system (34), wherein said pickers (R1–R4) are of the 4-axis type, and are equipped with rotatable handlers (22), with an individual grip of the sucker type, with an anti-crash system and with a suction circuit supported by a supplementary sleeve filter for air purification, comprising a suction group for each handler (22), equipped with a pump, special Vortex type inversion valves, and sucker type water washing tubes having water flowing counter-currently with respect to the suction direction.

2. The transfer system according to claim 1, wherein said product conveyor (11) is situated between the two support conveyors (13, 14).

3. The transfer system according to claim 2, wherein said supports (12) can be trays or cases completely closable, or a combination of trays or cases completely closable.

4. The transfer system according to claim 3, wherein said support conveyors (13, 14) are belt type conveyors.

5. The transfer system according to claim 3, wherein said support conveyors (13, 14) are belt conveyors with a hop-chain (17).

6. The transfer system according to claim 5, wherein the relative speed of the two support conveyors (13, 14) is fixed in relation to the ratio between a picker dedicated to the first (13) and the second support conveyor (14), within a certain regulation margin.

7. The transfer system according to claim 6, wherein said support conveyors (13, 14) have a relative speed fixed in a ratio that is variable from 1:2 to 1:5 with the first conveyor (13) translating at a higher speed.

8. The transfer system according to claim 7, wherein said support conveyors (13, 14) have a relative speed fixed in a ratio of 1:3.

9. The transfer system according to claim 1, wherein said presence and position surveying means (C1, C2, C3), each include a monochromatic television camera (20', 20", 20'") for acquiring the image of products P and one or more high frequency light sources (21).

10. The transfer system according to claim 1, wherein upstream of said product conveyor (11), a feeding belt (15) is positioned on which the products are placed at random, together with a vibrating belt (16) onto which the products are discharged to be separated if joined together.

11. The transfer system according to claim 1, wherein said presence and position surveying means (C1, C2, C3) are situated before the first picker (R1), before the second picker (R2) and before the finishing picker (R4).

12. A canning and packaging plant (30) of products (P), characterized in that said plant comprises a transfer system (10) according to claim 1.

13. The plant (30) according to claim 12, wherein, downstream of the transfer system (10), there is a line (42) as a continuation of the first support conveyor (13) together with a line (43) which continues the second support conveyor (14), wherein a packaging machine (47) of the flow-pack type, with thermo-welded film packaging, is provided for each line of filled supports (42, 43), when supports of the tray type are used, or a closing machine (54) when supports of the case/box type are adopted.

14. The plant (30) according to claim 13, wherein each of the two lines (42, 43), following the packaging unit (47), has a labelling machine (51), a metal detector (52), a weigh-price-marker (53) and a stacking or storage station (56).

15. The plant (30) according to claim 12, wherein upstream of said transfer system (10), a case producer (31) is present, from which a first case conveyor line (32) starts, alongside a second case conveyor line (33).

16. The plant (30) according to claim 15, wherein along the run of the two lines (32, 33), strippers (35, 36) are present for separating stacked trays.

17. The plant (30) according to claim 12, wherein said plant comprises a closing unit (54) and a control scale (55), when cases/boxes are used.

18. A transfer system for food products (P) comprising:

a product conveyor (11);

a first support conveyor (13) suitable for moving supports (12) in equicurrent with the food products (P);

a plurality of pickers (R1, R2, R3) situated in series along the run of said products (P) and supports (12) and suitable for individually collecting said products (P) from the product conveyor (11) to arrange them on the supports (12) translated from the first support conveyor (13);

presence and position surveying means (C1, C2) of which at least one is situated upstream with respect to the food products (P), of a first picker (R1) of said plurality of pickers (R1, R2, R3) suitable for detecting the presence, number, position and orientation of each product (P);

an electronic image identification and data processing system (34), in addition to calculation of potentiality, flow rate and distribution of the charge between the pickers (R1, R2, R3), as well as the control of the speed of the conveyors, to transfer data and instructions to the pickers, characterized in that said transfer system also comprises a second parallel support conveyor (14), transferring the supports (12) in equicurrent with respect to the food products (P), assisted by a specific finishing picker (R4), situated downstream of said plurality of pickers (R1, R2, R3), in turn equipped with presence and position surveying means (C3), also connected to said electronic image identification and data processing system (34), wherein said pickers (R1–R4) are equipped with rotatable handlers (22), with an individual grip of the sucker type, with an anti-crash system and with a suction circuit comprising a suction group for each handler (22), equipped with a pump, inversion valves, and sucker type washing tubes having water in counter-current flow with respect to the suction direction.

\* \* \* \* \*